April 22, 1969     F. A. MILITANA     3,439,551
TOOTHED WHEEL WITH REPLACEABLE TOOTHED SEGMENTS
Filed Sept. 13, 1967
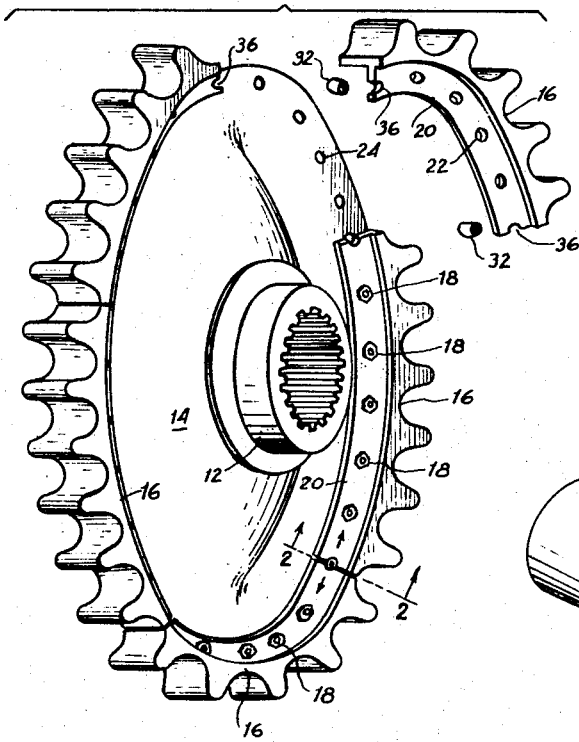
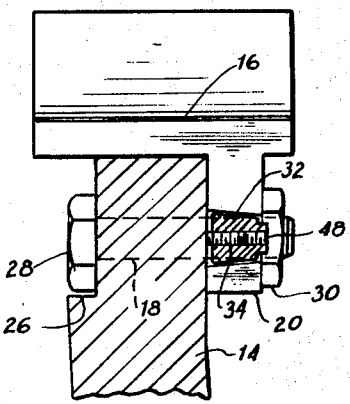
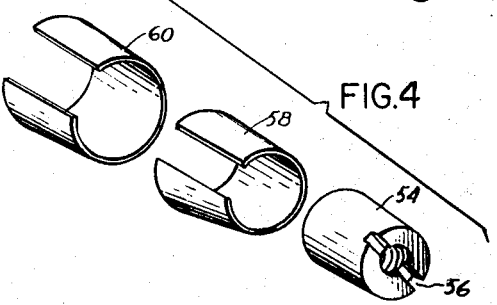
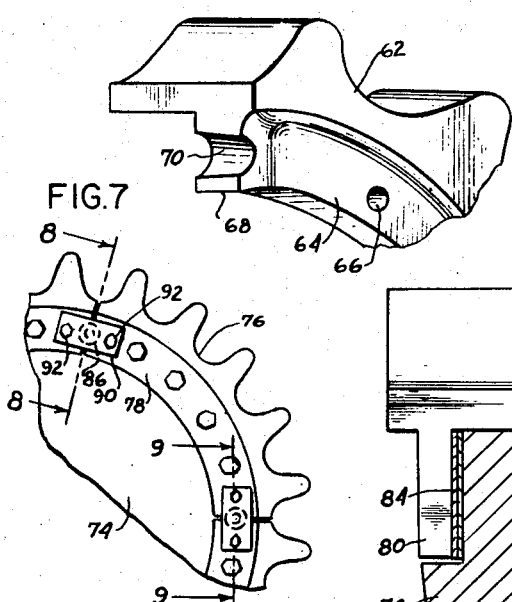
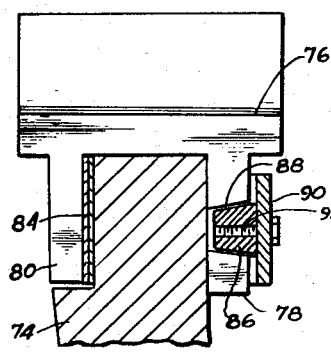
*INVENTOR.*
FRANK A. MILITANA
BY *James and Franklin*
ATTORNEYS April 22, 1969    F. A. MILITANA    3,439,551
TOOTHED WHEEL WITH REPLACEABLE TOOTHED SEGMENTS
Filed Sept. 13, 1967
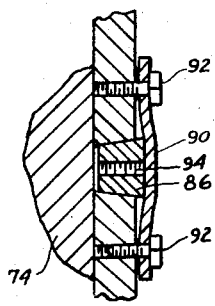
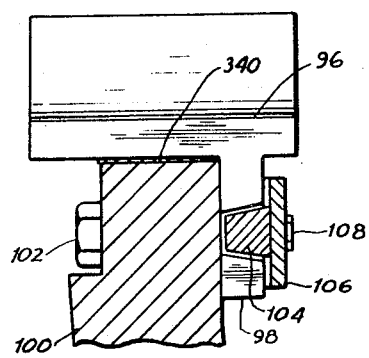
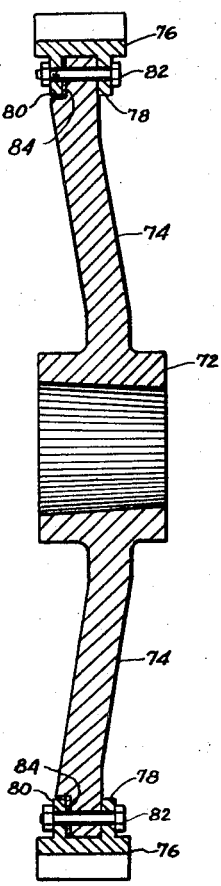
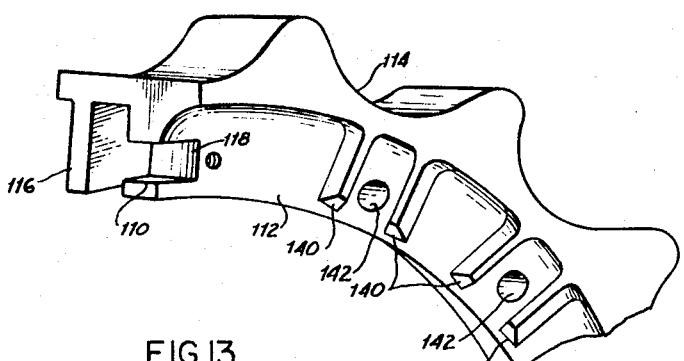
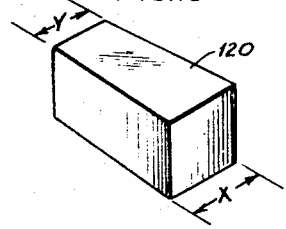
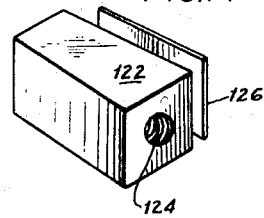
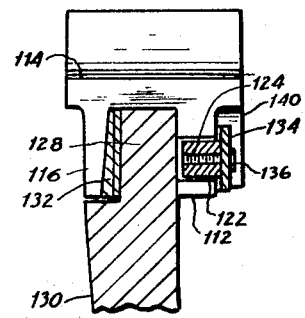
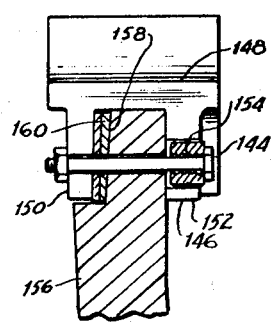
*INVENTOR.*
FRANK A. MILITANA
BY *James and Franklin*
ATTORNEYS April 22, 1969 F. A. MILITANA 3,439,551
TOOTHED WHEEL WITH REPLACEABLE TOOTHED SEGMENTS
Filed Sept. 13, 1967 Sheet 3 of 4

INVENTOR
FRANK A. MILITANA
BY
ATTORNEYS

April 22, 1969     F. A. MILITANA     3,439,551

TOOTHED WHEEL WITH REPLACEABLE TOOTHED SEGMENTS

Filed Sept. 13, 1967

INVENTOR.
FRANK A. MILITANA

BY *James and Franklin*

ATTORNEYS

United States Patent Office 3,439,551
Patented Apr. 22, 1969

3,439,551
TOOTHED WHEEL WITH REPLACEABLE TOOTHED SEGMENTS
Frank A. Militana, 550 Monterey Ave.,
Pelham Manor, N.Y. 10803
Filed Sept. 13, 1967, Ser. No. 667,569
Int. Cl. F16h 55/30, 55/16
U.S. Cl. 74—243                                   16 Claims

ABSTRACT OF THE DISCLOSURE

A known toothed wheel comprises a core and a plurality of replaceable curved toothed segments disposed around the periphery of the core in end-to-end relation. Releaseable bolts secure flanges of the segments to the core. The present wheel also has an adjustable means operative on the adjacent ends of the adjacent segments to transfer circumferential stress from one toothed segment to the next, so that the circumferential stress is distributed entirely around the wheel instead of being localized to the clamping bolts of that segment which is stressed directly. The adjustable means usually is a tapered plug which acts as a wedge operative between adjacent parts of the segment, together with screw means to force the plug in a direction transvers to the long axis of the segments. The plug may be disposed directly between the ends of adjacent segments, so that the circumferential force is transmitted by compression, or the plug may pass through a part connected to one segment and bear against a hole in the adjacent segment so that the circumferential force is transmitted by tension. Both types of plug may be used together. The adjustment of the plug or plugs also helps adjust and maintain the tooth spacing or pitch between one segment and the next segment.

Background of the invention

The replacement of a worn out sprocket wheel of a crawler or track laying vehicle is very difficult in the field. The vehicle must be jacked up, the track must be broken, the bottom track frame removed, and other parts removed before the sprocket wheel is ready for removal, and this still requires the use of a special heavy duty puller. The operation is time-consuming and expensive in labor and in "down-time."

To overcome this it has already been suggested to provide sprocket wheels with replaceable wear rim segments, in an effort to reduce repair costs and to facilitate re-rimming in the field. However, the shock load during operation is frequently too great to be taken up by the bolts of a single rim segment, and the segments have a tendency to shift, causing increased rapid wear of the segment and of the chain or track driven thereby. As this condition continues the bolts finally break and a segment falls off, and may cause extensive damage to the machine.

The problem is aggravated in a crawler type vehicle because it operates in various earth conditions, for example, small stones, rock chips, sand, pebbles, and the like. These pack between the teeth near the ends of the segments, and increase the stress on the clamp bolts and have a tendency to shift the segments circumferentially out of the proper tooth pitch.

Summary of the invention

As before, the toothed wheel comprises a core, and a plurality of replaceable curved toothed segments disposed around the periphery of the core in end-to-end relation. Releaseable means, usually bolts, clamp each of the segments to the core. My improved wheel has in addition an adjustable means operative on the adjacent ends of the adjacent segments, to transfer circumferential stress from one toothed segment to the next. In this way the circumferential stress is distributed entirely around the wheel instead of being localized to the clamping bolts of that segment whose teeth are receiving the circumferential stress.

The adjustable means is preferably a tapered plug which acts as a wedge operative between adjacent parts of the segment, together with screw means to force the plug in a direction transverse to the long axis of the segments. The plug may be disposed directly between the ends of adjacent segments, and then tends to force them apart so that the circumferential force is transmitted from one segment to the next segment by compression.

In another form, the plug may pass through a part connected to one segment, and bears against that side of a hole in the adjacent segment which is nearer the first segment, so that the tapered plug tends to pull the segment toward one another, and this transmits a circumferential force around the core from one segment to the next by tension rather than by compression.

Still another form of the invention combines both types of plug, in which case the circumferential force is transmitted from one segment to the next by both compression and tension. In all cases the adjustment of the plug or plugs serves also to help adjust the tooth spacing between one segment and the next segment.

Still another form of the invention may be used to convert a core which already has replaceable segments bolted thereto, but which does not have the adjustable plugs, to add the latter. The original segments usually have a single integral flange which is bolted against one side only of the core. A second flange then may be welded to the toothed segments to be received on the opposite side of the core, and these welded flanges may have their ends so shaped and dimensioned as to cooperate with tapered plugs, and to thereby embody the present improvement.

The core may be carried by a hub, or it may be a hollow drum, as in a concrete mixer, or it may be a turntable, or other such application requiring a toothed rim.

The foregoing and additional features are described in the following detailed specification, which is accompanied by drawings in which:

FIG. 1 is a perspective view showing a toothed wheel embodying features of the invention, with one segment displaced;

FIG. 2 is a fragmentary section drawn to enlarged scale, and taken approximately on the line 2—2 of FIG. 1;

FIG. 3 is a perspective view showing one form of adjusting screw and lock screw, used with the tapered plug tapered plug;

FIG. 4 is a perspective view showing a modified plug, and also showing tapered shims useable with any such tapered plug;

FIG. 5 is a fragmentary perspective view showing one end of a toothed segment of somewhat modified configuration;

FIG. 6 is a perspective view showing a tapered plug which is solid;

FIG. 7 is a fragmentary elevation showing a toothed wheel with segments having a double flange;

FIG. 8 is a fragmentary section drawn to enlarged scale and taken approximately on the line 8—8 of FIG. 7;

FIG. 9 is a fragmentary section taken approximately on the line 9—9 of FIG .7;

FIG. 10 is a fragmentary section like FIGS. 2 and 8, but showing the use of segments having a single flange combined with the solid plug of FIG. 6;

FIG. 11 is a diametrical section through a toothed wheel having segments with double flanges, this section passing through the clamping bolts;

FIG. 12 is a fragmentary perspective view showing a toothed segment modified to receive a plug which is rectangular in cross section;

FIG. 13 is a perspective view showing such a plug;

FIG. 14 is a perspective view showing a modified plug and a flat shim;

FIG. 15 is a fragmentary section through a toothed wheel having the plug of FIG. 14;

FIG. 16 is a fragmentary section showing further modifications;

Figure 17:
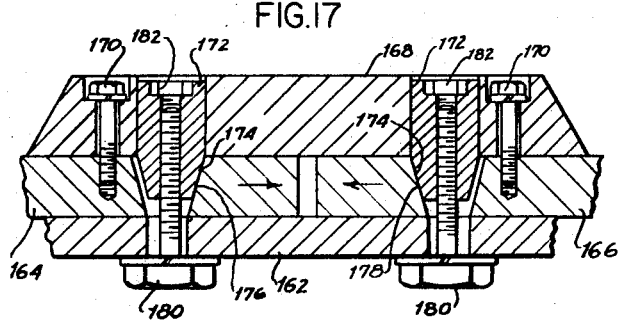
FIG. 17 is a fragmentary section taken circumferentially, but showing the use of tapered plugs designed to transmit force in tension.

Referring to the drawings, and more particularly to FIG. 1, the illustrated toothed wheel comprises a hub 12 carrying a core 14, and a plurality, in this case five, replaceable curved toothed segments 16, which are disposed around the periphery of the core 14. There are releasable means 18, usually nuts and bolts, for clamping the segments to the core, and for this purpose the segments each have a flange 20 formed integrally therewith. The flange has holes 22 which register with holes 24 in the core 14, and through which the bolts 18 pass. Core 14 may be formed integrally with hub 12 as shown in FIG. 11, and flange 20 is formed integrally with the toothed segment 16. Hub 12 is here shown splined for mounting on its driving shaft, but other methods of mounting the wheel may be employed. FIG. 2 shows how the core 14 may be stepped at 26 to prevent rotation of the heads 28 of the bolts 18, while the nuts 30 are being tightened.

In accordance with the present invention there is an adjustable means 32 operating on the adjacent ends of adjacent segments to transfer circumferential stress from one toothed segment to the next. As illustrated in FIGS. 1, 2 and 3 this means is a tapered or frusto-conical plug which is disposed directly between the ends of adjacent segments, and which tends to force them apart, so that circumferential force is transferred from segment to segment by compression. The plug 32 is threaded to receive a screw 34 (FIG. 3) which may be used to force the plug in a direction transverse to the long axis of the segments, or in this case in axial direction, to produce the desired wedging action between the segments. The ends of the segments are preferably recessed as indicated at 36 in FIG. 1, to locate the plug 32, and the recesses may be matingly tapered at the sides of the plug, although clearance is preferably provided at the top and bottom of the plug.

Figure 21:
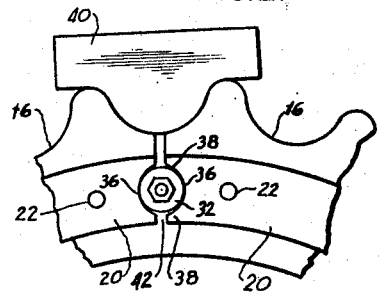
FIG. 21 illustrates the use of a template for securing a desired spacing between the teeth of adjacent segments.

This clearance is seen in FIG. 21, in which the segments 16 have flanges 20 with bolt holes 22, and in which the arcuate openings or recesses 36 for plug 32 are enlarged somewhat to provide clearance above and below the plug, this clearance being indicated at 38.

The resulting adjustment of the plug serves another purpose in affording correct spacing or pitch between the end tooth of one segment and the end tooth of the adjacent segment. This is shown in FIG. 21 in which a template 40 is provided, dimensioned and shaped to conform to the correct spacing between teeth. It will be evident that by adjusting the plug 32 the template 40 may be used to obtain the desired pitch between the adjacent teeth. The toothed segments 16 are very slightly shortened at their ends to leave a small clearance therebetween, as shown in somewhat exaggerated size at 42 in FIG. 21.

In the construction shown in FIGS. 2 and 3, the plug 32 tapers away from the core 14, and therefore must be moved outward to tighten the same. For this purpose the screw 34 acts as a push screw, the inner end of which bears against the face of the core 14 in order to force the plug 32 outward. The outer end of screw 34 has a recessed hexagon socket or so-called Allen socket shown at 44 in FIG. 3. To prevent rotation of the plug itself while screw 34 is being tightened, the outer end of the plug may be given a hex shape, shown at 46 in FIG. 3. The final adjustment of screw 34 may be locked, as by means of a lock screw 48, which in this example also has a recessed or Allen socket 50. A lock washer 52 may be disposed between screw 34 and lock screw 48. These parts in FIG. 3 correspond to what is shown in FIG. 2.

In the particular case shown in FIG. 1 there are five toothed segments, but a greater or lesser number may be employed. It will be understood that when all five tapered plugs 32 have been properly adjusted, any shock or stress applied to the teeth of one segment will be distributed around the wheel to all of the clamp bolts of all of the segments, instead of being localized to the bolts of that segment whose teeth are receiving the circumferential stress.

FIG. 4 illustrates some modifications of the tapered plug previously described. In FIG. 4 the plug 54 has a diametrical slot 56 to receive a tool to prevent rotation of the plug, instead of having the hexagon head 46 shown in FIG. 3. FIG. 4 also shows how one or more shims 58 and 60 may be applied to the plug if it becomes necessary to slightly increase the effective diameter of the same. Shims may be used with the plug of FIG. 3 or FIG. 6 or other such plug.

FIG. 5 illustrates a variation of the configuration of a toothed segment at its ends. In FIG. 5 the segment 62 has a flange 64 with bolt holes 66, as previously described, but at its end the flange 64 is thickened in axial direction, as shown at 68. This lengthens the recess 70 which receives the tapered plug, and makes available greater bearing surface between the plug and the segments.

In some cases it may be preferred to provide the toothed segments with double flanges which straddle the periphery of the core, instead of a single flange as shown at 20 in FIG. 2 and at 64 in FIG. 5. This construction is illustrated in FIG. 11 in which splined hub 72 is formed integrally with core 74, and the latter receives toothed segments 76 which have not only the flanges 78 on one side of the core, but additional flanges 80 on the other side of the core. The segments are secured to the core by a ring of clamp bolts 82, and shims 84 may be inserted between the flange 80 and the rim of core 74, so that the bolts 82 may be tightened with minimum displacement of the flanges.

When using segments with double flanges it is difficult to use the outwardly forced plugs shown in FIG. 2, because segments and their interposed plugs would have to be applied simultaneously over the rim of the core. It is much easier to employ a plug which tapers toward the core, as shown at 86 in FIG. 8. In this case segment 76 has flanges 78 and 80 secured to core 74, with optional shims 84 therebetween, all as previously described. The ends of flange 78 are recessed with tapered recesses 88 to receive the plug 86. The clearance shown in FIG. 8 above and below the plug corresponds to the clearance shown at 38 in FIG. 21, as previously described.

To force the plug inward, it is held by a strap or plate 90, as is also shown in FIGS. 7 and 9, and the ends of strap 90 are secured to the flange of the segment, and may be drawn inward, by appropriate screws 92. These may be threaded in flange 78, or in the core 74, or may be bolts passing all the way through both flanges and the core. In any case it will be understood that the plug 86 is long enough to initially project outward, and thus may be forced inward to a desired amount by means of the screws 92. The plug is tightened by screw means, acting through a plate, instead of directly in the plug itself.

As so far described the plug may be solid, as shown in FIG. 6, but in that case a difficulty which may arise is to loosen or back out the plug if it becomes necessary to change the segments because of wear or tooth breakage, etc. To aid in loosening the plug after removal of plate 90, the plug is preferably internally threaded as shown at 94 in FIGS. 8 and 9. This is adapted to receive a screw (which need not be in the plug during use), and the inner end of the screw presses against the core 74, and forces the plug outward.

It should be understood that such provision for removal of the plug is only needed when the segments are double flanged as shown in FIGS. 7 and 8. If the segments have a single flange the plug may be solid as shown in FIGS. 6 and 10. In FIG. 10 the toothed segment 96 has a single flange 98 which is bolted to core 100 as shown at 102. The solid plug 104 (FIGS. 6 and 10) is forced inward by means of a plate 106, the ends of which are drawn inward by mounting screws or bolts one of which is partially visible at 108. The construction corresponds to that previously described with reference to FIGS. 7, 8 and 9, except that no provision for extraction of plug 104 is needed because the segment 96 with its single flange 98 is readily removed, whether or not the plug is there.

As so far described the plug is frusto-conical, but it may be square or rectangular in section, as shown in FIGS. 13 and 14. In FIG. 13 the top and bottom of the plug are parallel, but the side walls taper from right to left, that is, the dimension X is greater than the dimension Y. The ends of the segments have mating recesses, as shown at 110 in FIG. 12, this recess being formed in flange 112 of a toothed segment 114 which in the illustrated example happens to have a second flange 116. The back wall 118 of the recess 110 is tapered or biased to match the taper of the plug 120 shown in FIG. 13.

In FIG. 14 the plug 122 differs from plug 120 in having an internally threaded hole 124 passing therethrough. One or more shims 126 may be used with either plug if it becomes necessary to enlarge the plug.

Referring now to FIG. 15, the toothed segment 114 has its flanges 112 and 116 straddling the peripheral portion or rim 128 of core 130. Shims may be used as shown at 132, and the segments are bolted in position by a ring of bolts (not shown in FIG. 15) as previously described. Rectangular plug 122 is forced inward by means of a plate 134 the ends of which are urged inward by appropriate screws, as previously described with reference to FIGS. 7–10. The outer portion of the head of one of the screws is shown at 136.

In FIG. 15 a tapered shim 132 is shown. For additional thickness this may be supplemented by a straight shim, as shown. The inside of the flange 116 is tapered, and the tapered shim matches the taper of the flange. The purpose is to facilitate addition, and also a subsequent outward removal, of the toothed segments when they are double flanged as here shown. The taper also permits a tight surface contact before the bolts apply their full clamping load.

Here again, provision is preferably made to facilitate extraction of the plug, and for this purpose an internally threaded hole 124 (FIGS. 14 and 15) is provided. After removing the plate 134 a screw may be fed into hole 124 until its end bears against the outer face of core 130 (FIG. 15), thereby forcing the plug outward, for removal preliminary to removing the toothed segment. Alternatively the threaded end of an eye bolt or other bolt may be screwed into the hole, and then used with a pulling tool to pull the plug outward.

The toothed segment shown in FIG. 12 illustrates another feature, namely the provision of ribs 140 on each side of the clamp bolt holes 142. These are provided to protect the nuts and threaded ends of the bolts from damage or shear, due to stones, chips of rock and other elements which usually become lodged between the framework of a machine or vehicle and the rotating wheel. Either or both flanges which receive ribs 140, as determined by the construction of the particular machine or vehicle on which the segments are being used. Usually they are provided on the outer or more vulnerable side which is exposed to the damaging elements. The outer faces of the ribs 140 are preferably sloped to more readily shed earth and stones.

Here again it may explained that if the toothed segments have a single flange the solid plug of FIG. 13 may be employed, instead of the internally threaded plug of FIG. 14.

FIG. 16 is a fragmentary radial section corresponding generally to FIG. 15, but illustrating two differences. One is the use of a bolt and nut 144 to force the tapered plug 146 inward. To facilitate extraction of the plug when, as here, the toothed segment 148 has two flanges 150 and 152, the hole through plug 146 which receives the bolt 144 may be made somewhat oversized and may be internally threaded as shown at 154. Thus after removal of bolt 144 an attachment having a puller screw of appropriate size may be secured into threaded hole 154, thus forcefully pulling the plug outward.

Another change illustrated in FIG. 16 is the use of an outward taper shown at 158 for the peripheral portion of core 156. Shim 160 has a mating taper, thus filling the available space. Unlike FIG. 15, the flanges are not tapered. Here again the taper facilitates the installation and also the outward removal of a double-flanged toothed segment after its bolts have been removed. In FIG. 15 it is assumed that the core 130 is already in the field and has no taper. In FIG. 16 the core 156 has the desired taper.

As so far described the action of the plug has been compressive, that is, the plug has been received directly between the ends of adjacent segments, and tends to force them apart, so that circumferential force is transferred from one segment to the next by compression. However, it is also feasible to distribute the force by tension instead of compression, and such an arrangement is shown in FIG. 17, which is a section taken circumferentially of the wheel. The rim portion of the core is indicated at 162, and the flanges of adjacent toothed segments are shown at 164 and 166. A small plate 168 is applied over the ends of the flanges, and may be held in position by screws 170. Plugs 172 pass through plate 168, and their tapered inner ends 174 bear against the tapered sides 176 and 178 of the segments 164 and 166 respectively.

The plugs 172 are internally threaded to receive screws 180 which serve to draw the plugs 172 inward. To prevent rotation of the plugs when tightening the screws 180, the outer ends of the plugs may be provided with recessed hexagon sockets 182. Alternatively they may be provided with a hex head as shown at 46 in FIG. 3, or a slot as shown at 56 in FIG. 4, except that the head would be provided at the outer or larger end of the plug instead of at the inner or smaller end of the plug. The plugs pull the segments 164 and 166 toward one another, as indicated by the arrows, and thus transmit circumferential force from one segment to the next by tension rather than by compression. This again distributes any circumferential force or shock applied to the clamp bolts of one segment around the circle of clamp bolts for all segment.

Figure 18:
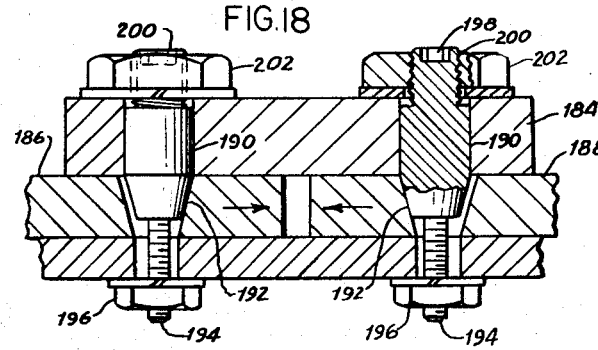
FIG. 18 is a section like FIG. 17, but showing a modified arrangement for the same purpose.

A modification of the structure shown in FIG. 17 may be described with reference to FIG. 18. Here again, a short plate 184 overlaps the flange ends 186 and 188 of adjacent toothed segments, and it carries tapered plugs 190, the tapered inner ends of which bear against the nearer sides 192 of tapered holes receiving the same. In this case the plugs 190 have threaded extensions 194 which receive lock washers and nuts 196, the latter serving to draw the plugs inward and to thereby pull the segments 186 and 188 toward one another, as suggested by the arrows. To prevent rotation of the plugs, they may be provided with recessed hex sockets indicated at 198, as previously described.

Plugs 190 have threaded extensions at their opposite ends 200, and these receive lock washers and nuts 202 which are added or tightened after appropriate adjustment of the plugs 190, and which serve to hold the overlapped plate 184 in position. This eliminates the need for screws like the screws 170 shown in FIG. 17.

In order to adjust the segments in tension instead of compression, it is not necessary to employ two tapered plugs instead of one. It will be evident in either FIG. 17 or FIG. 18 that the overlapped plate could be welded to one toothed segment, with no tapered plug at that end. The tapered plug at the other end then would be used for adjustment.

Figure 22:
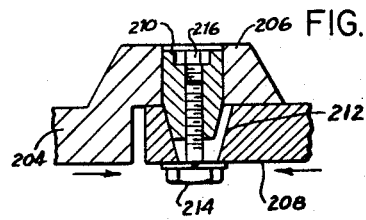
FIG. 22 is a fragmentary section taken in circumferential direction, and showing a modification in which the segments overlap to receive a plug for urging one segment toward the other in tension.

For this purpose the overlapping ends may be integral instead of welded, and such a construction is shown in FIG. 22, in which the flange 204 of one segment is provided with an integral but offset portion 206 which overlaps the adjacent flange end 208. As before, the plug 210 passes through part 206, and its tapered inner end is received in a tapered hole 212 in flange end 208. The tapered plug bears against that side of the hole which is nearest the other segment 204. The plug is drawn inward by means of a screw 214, much as in FIG. 17. Again, the outer end of the plug may have a recessed hexagon socket or Allen type socket 216 to prevent rotation of the plug while tightening the screw 214.

Figures 23, 24:
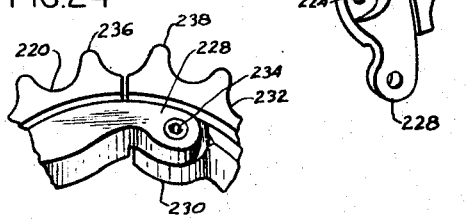
FIG. 23 is a perspective view showing a toothed segment modified for overlap at the ends.
FIG. 24 is a fragmentary perspective view showing how the adjacent segment ends overlap.

A variant of this overlapped construction is shown in FIGS. 23 and 24. The segment 220 has the usual flange 222 with holes 224 for clamp bolts. The end 226 of the flange is recessed or halved in thickness toward one side, and the end 228 is recessed or halved in thickness toward the opposite side. Thus the ends of two adjacent segments may overlap as shown in FIG. 24, in which the extension 228 of segment 220 overlaps the end 230 of segment 232. A tapered plug 234 is employed, as described with reference to FIG. 22, and may be adjusted to provide exactly the desired pitch between the adjacent teeth 236 and 238 of the segments. In addition circumferential force on one toothed segment is transmitted to the remaining toothed segments, all as previously explained.

Figure 19:
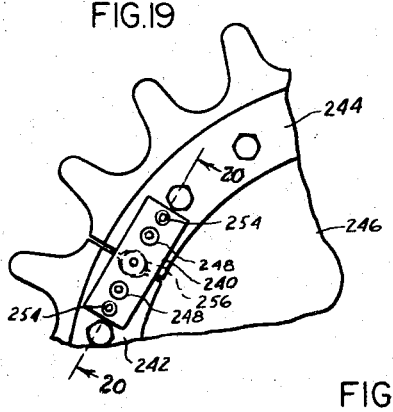
FIG. 19 is a fragmentary elevation showing the use of plugs for transmitting force both in compression and in tension

As so far described the adjacent segments are connected either by compression or by tension, but if desired both types of adjustment may be provided together, and such a construction is next described with reference to FIGS. 19 and 20. Referring to these figures a plate 240 overlaps flanges 242 and 244 of adjacent toothed segments carried by a core 246. Plugs 248 are received in plate 240, and their tapered inner ends bear against the adjacent sides of tapered holes in the flanges 242 and 244. These plugs are drawn inward by means of nuts 250 received on threaded shanks 252 of the plugs. Plate 240 is held in position by a pair of screws 254. The construction in this example is similar to that shown in FIG. 17, except that it employs nuts 250 resembling the nuts 196 shown in FIG. 18.

In addition, there is a third tapered plug 256 which is disposed directly between the adjacent ends of the flanges 242 and 244. These ends are preferably recessed to receive the plug 256 as was previously described with reference to FIGS. 1–10.

Plate 240 has a threaded hole receiving an adjusting screw 258 the inner end of which bears against the plug and may be used to force the plug inward, thereby urging the toothed segments apart. Alternatively, plug 256 may be internally threaded to receive a screw which passes through core 246, and which would pull the plug inward as arranged for plugs 248. The plug 256 is shown with a threaded hole at 260 which may be used for that purpose. Even when push screw 258 is used, the threaded hole 260 may be provided to receive an extraction screw to help retract the plug for removal if the toothed segments are double flanged, rather than single flanged as shown in FIG. 20.

Figure 20:
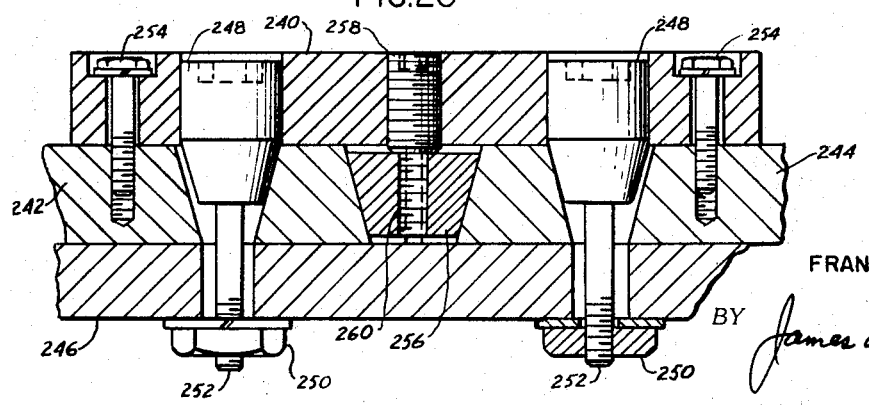
FIG. 20 is a fragmentary circumferential section drawn to larger scale and taken approximately on the line 20—20 of FIG. 19.

It will be understood that with the construction shown in FIG. 20, the tension adjustment must be temporarily relieved when tightening the compression plug 256, and conversely the compression plug 256 should be temporarily backed up or relieved when using the tension adjustment. In this way positive movement of the segments toward or away from one another may be provided until exact pitch is obtained, as by means of the template 40 shown at FIG. 21. When the adjustment has been completed and all three plugs tightened for each junction around the wheel, any circumferential shock or force applied to one toothed segment is transmitted to the other toothed segments by both compression and tension. As to the nearest two segments, there is direct compressive force on one and direct tensile force on the other, but indirectly the compressive and tensile forces may be considered to be transferred entirely around the wheel.

Figure 25:
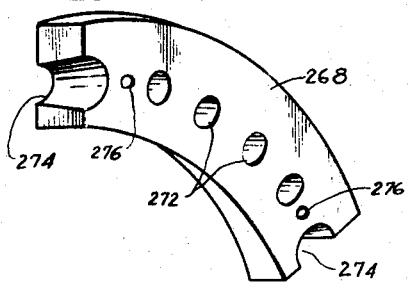
FIG. 25 is a perspective view of a conversion flange which may be added to a toothed segment to embody the present invention.

There are earth moving machines and other machines of the crawler type already out in the field which have toothed segments secured to a core by means of clamp bolts, but without the additional adjustable plugs here described. Such machines may be converted to employ the present improvement, and referring to FIG. 26, core 262 has releasable toothed segments 264 with a single flange 266. Another flange 268 may be added to the segments by welding, as shown at 270. Referring to FIG. 25, this added flange 268 has holes 272 (these holes may be threaded if desired) which register with the original holes to receive clamp bolts. The ends of the conversion flange 268 have tapered recesses 274, as previously described with reference to FIGS. 7–9. These received tapered plugs, and the latter may be tightened in any desired fashion, as by use of a plate such as that shown at 90 in FIGS. 7–9. In FIG. 25 the holes 276 are threaded holes to receive screws which anchor and ajust the plate 90, all as previously described.

Figure 27:
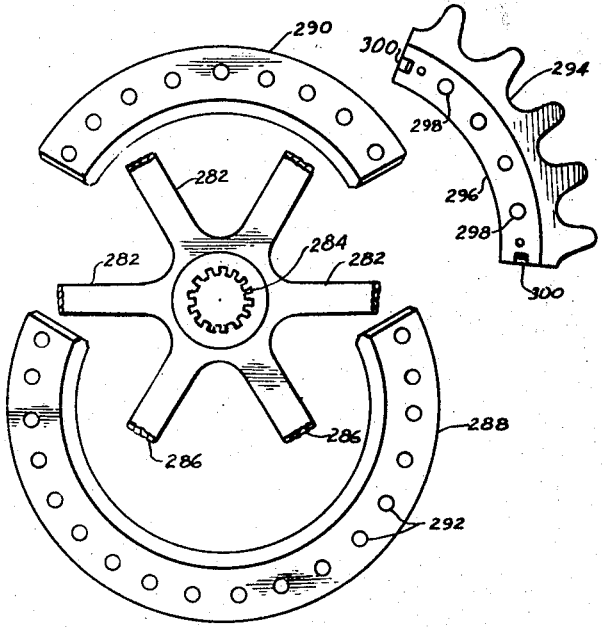
FIG. 27 is an exploded view showing another way to convert a toothed wheel, which in this case is spoked.
Figure 28:
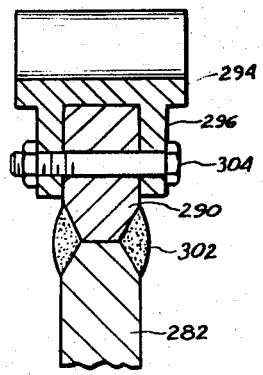
FIG. 28 is a fragmentary section through the rim portion of the toothed wheel of FIG. 27 after conversion.

Another and more drastic conversion may be explained with reference to FIGS. 27 and 28. In this case the wheel is large enough to have spokes 282 radiating from hub 284. The original wheel may have been a one-piece spoke or disc-type wheel with integral rim and teeth. After breakage or wear of the teeth, the entire rim may be cut away from the spokes as indicated at 286, and a substitute conversion rim 288 is welded around the spokes. This rim is preferably made in sections, here shown at 288 and 290, for easier application in the field. The edges are appropriately bevelled to facilitate the welding operation, as shown at 302 in FIG. 28. The rim 288, 290 thus added has holes 292 for the clamp bolts which hold toothed segments end-to-end, as previously described, and one such segment is shown at 294 with a flange 296 having holes 298 for the clamp bolts. Holes 292 and 298 register. Clamp bolt 304 is shown in FIG. 28. In accordance with the present improvement the ends of the toothed segments are recessed, in this case for rectangular plugs, as shown at 300 in FIG. 27. Round plugs could be used.

After the conversion rim segments 288 and 290 have been positioned over the ends of the spokes 286, all the toothed segments 294 are mounted on the split rim 288. The plugs are then put in place and the tooth pitch is properly adjusted. It is preferable to have the toothed segments 294 span the end of the sections 288 and 290 of the conversion rim, as is suggested by the position of the toothed segment in FIG. 27. All this is preferably done before commencing the welding operation.

It will be understood that as before the segments are applied to the core by means of clamp bolts, and before final tightening of the clamp bolts the tooth pitch between segments is adjusted with the aid of a suitable template as shown in FIG. 21. Because of the action of the tapered plugs which are urged between the segments, any circumferential force or shock applied to one segment is transmitted to the others.

Figure 26:
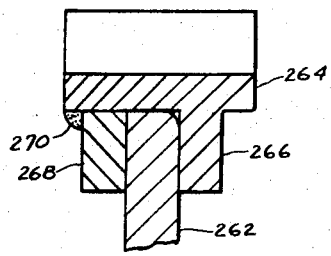
FIG. 26 is a fragmentary section through such a modified toothed segment and showing a section of the conversion flange welded to said segment.
Figure 29:
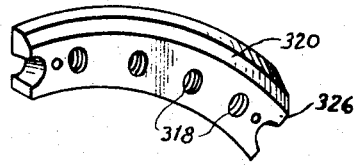
FIG. 29 is a perspective view of another conversion flange having a bevelled edge and threaded holes
Figure 30:
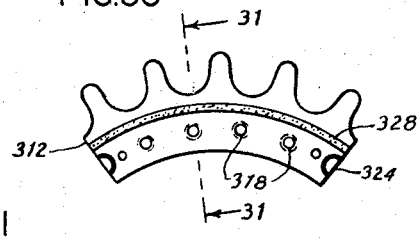
FIG. 30 shows the same applied to one of the segments.
Figure 31:
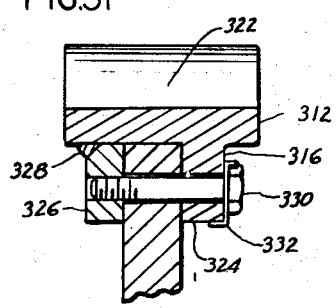
FIG. 31 is a fragmentary radial section taken on the line 31—31 of FIG. 30 with the addition of a bolt and lock washer.

A modification of the conversion arrangement shown in FIG. 25 and 26 is illustrated in FIGS. 29, 30 and 31. The conversion flange shown in FIG. 29 differs from that shown in FIG. 25 in having threaded holes 318, and in having a bevelled edge 320 to facilitate the welding operation. FIG. 31 shows the toothed segment 322 with its original single flange 324. The conversion flange 326 is welded to the toothed segment 322 as indicated at 328. The clamp bolt 330 is screwed directly into the flange 326. It may be locked against rotation by means of a lock washer 332, the top of which is bent and hammered against the head of the bolt, and the bottom of which is bent and hammered against the flange 324, as shown in the drawing. Other means to lock the screw may be provided, and for that matter, a bolt and nut may be used instead of threading the bolt directly into the threaded holes in the conversion flange 326.

In some cases a long shim or a number of shorter shims, each preferably having a length almost equal to that of the inner periphery of the toothed segment, may be used between the curved outer periphery of the core and the curved inner periphery of the toothed segments. Such a shim is indicated in FIG. 10 at 340, but may be used in other described forms of the invention. By use of such shims the outside diameter of the core may be slightly enlarged for proper contact between the two curved surfaces, and to correct the circumferential dimension needed for maintenance of correct tooth pitch entirely around the wheel.

Most detailed features shown throughout the drawings are interchangeable. Plugs may be round or square or of any other section. Shims may be used in all cases. Ribs such as 140 in FIG. 12 may be used on other flanges. The compression plug in FIG. 20 may be like the other types shown, and the same applies to the tension plugs. The feature of FIG. 20 is to combine both compression and tension plugs in one structure.

It is believed that the construction, operation and method of use of my improved toothed wheels, as well as the advantages thereof, will be apparent from the foregoing detailed description. Adjacent toothed segments are held circumferentially apart, or drawn circumferentially together, or a combination of both. A wedging connection holds the segments at a desired distance which is precisely gaged by a template. The invention reduces the stress on the clamp bolts. It reduces wear of teeth and chains or gearing which they engage, because the teeth remain in proper pitch, and smoother operation is achieved. Less time is required to replace worn segments. The improvement is particularly useful for gears, chain engaging sprockets, conveyors, crawler tracked vehicles, and other such applications.

It will be understood that while I have shown and described the invention in several preferred forms, changes may be made without departing from the scope of the invention as sought to be defined in the following claims. In the claims the reference to a toothed wheel with replaceable toothed segments is not intended to exclude the similar use of toothed segments around a core which is a hollow drum or a turntable or the like. The reference to screw means to move the plug includes screws operating on a plate as well as a screw working directly in the plug itself.

I claim:

1. A toothed wheel with replaceable toothed segments, said wheel comprising a circular core, a plurality of replaceable toothed segments mounted on said core in end-to-end relation, releasable means clamping each of said segments to the core, and operative means on the adjacent ends of adjacent segments to transfer circumferential stress from one toothed segment to the next, whereby the circumferential stress is distributed around the wheel instead of being localized to the clamping means of that segment which is receiving the circumferential stress.

2. A toothed wheel as defined in claim 1, in which the operative means is a tapered plug acting as a wedge which is operative between adjacent parts of the segments near the ends of the segments, and screw means to force the plug in a direction transverse to the long axis of the segments.

3. A toothed wheel as defined in claim 2, in which the plug is disposed between the ends of adjacent segments and tends to force them apart and to transmit circumferential force from one segment to the next segment by compression.

4. A toothed wheel as defined in claim 3, in which said replaceable curved toothed segments each have a single integral flange bearing against one face of the core, a second flange welded to each of the segments and received on the opposite side of the core from the said integral flange, releasable bolts passing through the flanges and core to clamp the segments to the core, and in which the plug is disposed to act on the ends of the welded flanges.

5. A toothed wheel as defined in claim 3, in which said core is made up of an inner part and a rim welded around the inner part, said rim having a ring of holes therearound receiving releasable bolts, which secure said toothed segments end to end around the rim, and tapered plugs acting as wedges as defined in claim 3, and in which the rim consists of at least two parts secured end to end.

6. A toothed wheel as defined in claim 2, in which the plug passes through and is held by a part which is connected to one segment, and bears against that side of a hole in an adjacent segment which is nearer the first segment, whereby the plug tends to pull the segments toward one another and to transmit circumferential force from one segment to the next by tension.

7. A toothed wheel as defined in claim 6, in which an additional plug is disposed between the ends of adjacent segments, whereby circumferential force is transmitted from one segment to the next segment by both compression and tension.

8. A toothed wheel as defined in claim 6, in which there is a short plate which overlaps the adjacent ends of two adjacent segments, and in which each end of the plate has a plug passing therethrough, and in which each adjacent segment end has a hole against which the tapered plug bears on the side nearer the other plug, whereby both plugs tend to pull the segments toward one another.

9. A toothed wheel as defined in claim 6, in which the end of one segment has an integral portion which is offset from and overlaps the adjacent end of the other segment, and in which the plug passes through one such overlapping end and bears against the side of the hole in the other end.

10. A toothed wheel as defined in claim 8, in which there is a third plug which is disposed between the adjacent segment ends and tends to force them apart, whereby circumferential force is transmitted from one segment to the next by both compression and tension.

11. A toothed wheel as defined in claim 2, in which the end of one segment has an integral portion which is offset from and overlaps the adjacent end of the other segment, and in which the plug passes through one such overlapping end and bears against the side of the hole in the other end.

12. A toothed wheel as defined in claim 2, in which said replaceable curved toothed segments each have a single integral flange bearing against one face of the core, a second flange welded to each of the segments and received on the opposite side of the core from the said integral flange, releasable bolts passing through the flanges and core to clamp the segments to the core, and in which the plug is disposed to act on the ends of the welded flanges.

13. A toothed wheel as defined in claim 2, in which said core is made up of an inner part and a rim welded around the inner part and having a ring of holes therearound receiving releasable bolts, which secure said toothed segments around the rim and tapered plugs acting as wedges as defined in claim 2.

14. A toothed wheel as defined in claim 2, in which said core is made up of an inner part and a rim welded around the inner part, said rim having a ring of holes therearound receiving releasable bolts, which secure said toothed segments end to end around the rim and tapered plugs acting as wedges as defined in claim 2, and in which the rim consists of at least two parts secured end to end.

15. A toothed wheel as defined in claim 1, in which the releasable means clamping the segments to the core is a threaded fastener having a head, and in which the segments at each side of the head have raised ribs to protect the head against excessive wear when running in contact with earth and/or stones or the like.

16. A toothed wheel as defined in claim 1, in which the releasable means clamping the segments to the core is a threaded fastener having a nut, and in which the segments at each side of the nut have raised ribs to protect the nut against excessive wear when running in contact with earth and/or stones of the like.

References Cited

UNITED STATES PATENTS

| | | | |
|---|---|---|---|
| 482,864 | 9/1892 | Conradson | 74—243 XR |
| 752,898 | 2/1904 | Fogarty | 74—448 |
| 3,083,585 | 4/1963 | Dawe et al. | 74—243 |

FRED C. MATTERN, JR., *Primary Examiner.*

JAMES A. WONG, *Assistant Examiner.*

U.S. Cl. X.R.

74—447, 448, 450